May 9, 1967 L. J. COLEMAN 3,319,166
FIXTURE FOR SECURING AND ELECTRICALLY TESTING AN ELECTRONIC
COMPONENT IN FLAT PACKAGE WITH COPLANAR LEADS
Filed July 21, 1964 2 Sheets-Sheet 1

WITNESSES:
John L. Chopp
James F. Young

INVENTOR
Louis J. Coleman
BY
Gordon H. Telfer
ATTORNEY

United States Patent Office 3,319,166
Patented May 9, 1967

3,319,166
FIXTURE FOR SECURING AND ELECTRICALLY TESTING AN ELECTRONIC COMPONENT IN FLAT PACKAGE WITH COPLANAR LEADS
Louis J. Coleman, Baltimore, Md., assignor to Westinghouse Electric Corporation, East Pittsburgh, Pa., a corporation of Pennsylvania
Filed July 21, 1964, Ser. No. 384,081
7 Claims. (Cl. 324—158)

This invention relates generally to apparatus for the electrical testing of an electronic component and, more particularly, to a test fixture for mechanically securing and making electrical connection to an electronic component that is housed in a flat package with coplanar leads. The invention is particularly applicable to the electrical testing of semiconductor integrated circuits.

Electronic components such as semiconductor integrated circuits are frequently packaged within a flat enclosure having coplanar electrical leads extending therefrom. This is a configuration that provides efficient use of volume and permits a relatively large number of leads, typically up to 14, from a flat enclosure of about ¼ x ⅛ inch in major surface dimensions. For further description of a semiconductor integrated circuit flat package with which apparatus in accordance with the present invention may be advantageously used, reference should be made to copending application Ser. No. 206,906, filed July 2, 1962, by J. P. Stelmak and assigned to the assignee of the present invention.

An integrated circuit is usually tested before its package is sealed with electrical connection being made by the use of probes. Some damage that affects performance may, however, occur during final packaging. Furthermore, the integrated circuit user requires some means for testing that doesn't require permanent mounting of the packaged component.

A need therefore exists for a means for securing a flat packaged integrated circuit within a test circuit for determining the quality of performance of the integrated circuit in a reliable and inexpensive way. Previous to the present invention, efforts in this direction have been generally characterized by the high initial cost of the test fixture and also by frequently inadequate performance especially resulting from lack of any positive means to ensure the making of good electrical contact between the leads of the component and the conductors of the test fixture.

It is, therefore, an object of the present invention to provide an improved test fixture for an integrated circuit, or other electronic component, enclosed within a flat package having coplanar leads.

Another object is to provide an integrated circuit test fixture that ensures accurate lead disposition.

Another object is to provide a test fixture that provides means for detecting whether the integrated circuit is properly disposed within the test fixture and that proper conditions for the test, such as adequate power in the test circuit, are present.

Another object is to provide an integrated circuit test fixture that is both economical to fabricate and convenient to use.

The present invention, briefly, achieves the above-mentioned and additional objects and advantages in the provision of a test fixture that includes a circuit board of electrically insulating material having a pattern of electrical conductors on each of the opposing major surfaces thereof with the conductors from one of the surfaces extending through the circuit board to a position on the other of the surfaces adjacent the termination of the pattern of conductors on that surface. Disposed over the circuit board is a barrier board of an insulating material that has an aperture for the disposition of the packaged electronic component to be tested with grooves for the disposition of the leads of the electronic component so that when a component is placed in the fixture, the leads are placed in contact with both patterns of electrical conductors. Also provided is a pressure plate including a first portion that extends over the barrier board and a second portion that projects within the aperture within the barrier board to apply force to the leads of the electronic component under test so as to ensure good contact with the conductors on the circuit board. In addition there is provided a means for securing the elements of the test fixture together so that it may, if desired, be used as an enclosure in shipping the packaged electronic component. The assembled test fixture with component therein is inserted into a conventional printed circuit board receptacle where contact is made to each of the conductors at an edge of the test fixture circuit board.

The present invention, together with the above-mentioned and additional objects and advantages thereof, will be better understood by referring to the following description together with the accompanying drawing, wherein.

Figure 1:
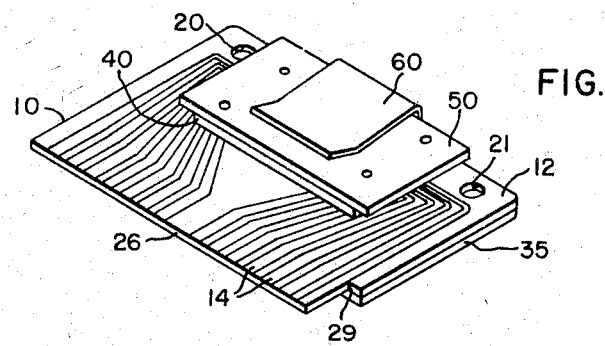
FIGURE 1 is a perspective view of an assembled test fixture in accordance with the present invention.
Figure 2:
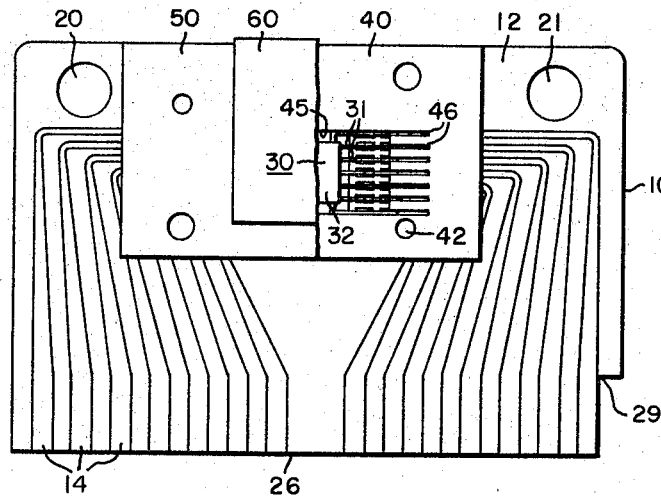
FIG. 2 is a plan view, partly broken away, of the assembled test fixture of FIG. 1.
Figure 3:
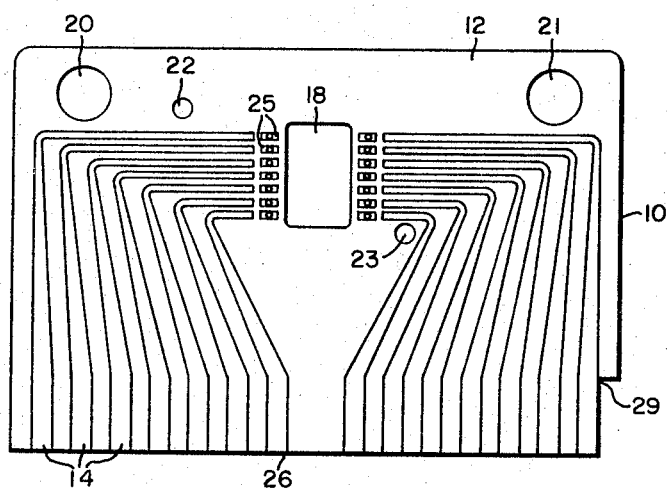
Figure 4:
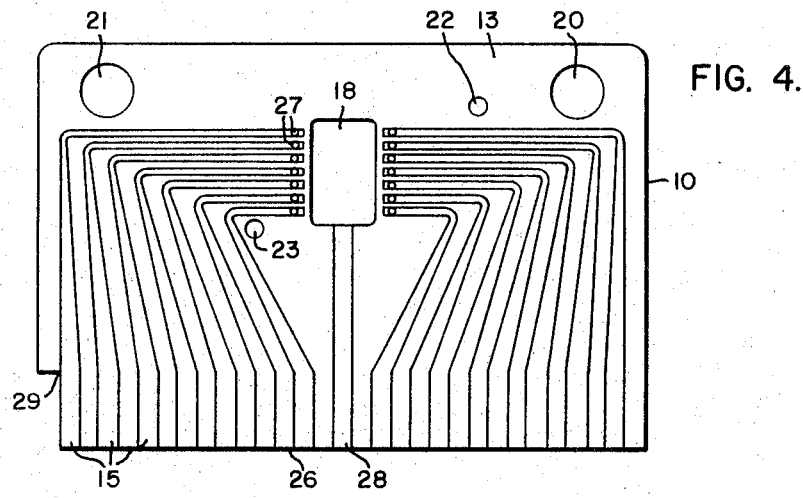
Figure 5:
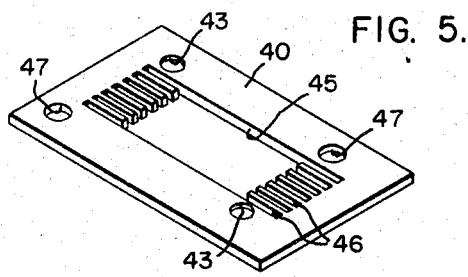
Figure 6:
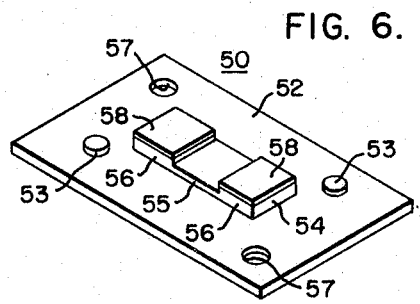
Figure 7:
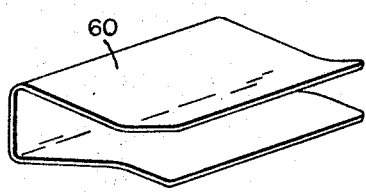

FIGS. 3 and 4 are, respectively, top and bottom plan views of the circuit board shown in the test fixture of FIGS. 1 and 2; and FIGS. 5, 6 and 7 are perspective views of, respectively, the barrier board, the pressure plate, and the spring clip employed in the test fixture of FIGS. 1 and 2.

Referring now to the drawing, particularly FIGS. 1 to 4 thereof, the test fixture includes a circuit board 10 that is an approximately rectangular sheet of insulating material having opposed upper and lower major surfaces 12 and 13 on which are disposed patterns of a plurality of conductors 14 and 15, respectively. The circuit board 10 has a device receiving aperture 18 therein of a configuration approximately conforming to that of devices to be tested in the test fixture. Other apertures 20 and 21 shown in corners of the circuit board 10 are provided for automatically loading and withdrawing test fixtures from a receptacle so a large number of components can be tested in a short time. Additional apertures 22 and 23 through the circuit board 10 diagonally disposed on opposite sides of the device receiving aperture 18 are for the location of additional elements of the test fixture as will be described.

On the top surface 12 of the circuit board 10, the pattern of conductors 14 includes a separate conductor for each lead of the device to be tested. In this example, the integrated circuit 30 (FIG. 2), or other device to be tested, has a total of fourteen leads 31, seven of which extend from each of the longest sides of the rectangular flat enclosure 32. Hence, there are fourteen conductors in the pattern of conductors 14 that extend from positions proximate to the device receiving aperture 18 and terminate at an edge 26 of the circuit board 10.

The pattern of conductors 15 on the bottom surface 13 of the circuit board 10 is similar to the pattern 14 on the top surface 12 in that there is a conductor for each lead of the device to be tested that extends from an internal point proximate to the device receiving aperture 18 to the edge 26 of the circuit board. The termination of the conductors 14 and 15 at the edge 26 of the circuit board 10 is so that the assembled test fixture may be inserted into a conventional receptacle having spring contacts for each of the conductors in the patterns on the top and bottom surfaces, such a receptacle being well known and commonly referred to as a printed circuit connector.

The pattern of conductors 15 on the bottom surface 13 of the circuit board 10 extends through the circuit board 10 proximate to the device receiving aperture 18 and finally terminates on the upper surface 12 of the surface board at a position between the internal terminations of the conductors 14 and the device receiving aperture 18.

The upper side 12 of the circuit board 10 will sometimes be referred to herein as the "power side" as it is usually the pattern of conductors 14 on this surface that is used to energize the electronic component under test to check its performance in its intended use. The bottom surface 13 of the circuit board will sometimes be referred to herein as the "sense side" as it is through the conductors 15 on this surface that the electric component under test is checked to ensure that any defect in its performance is not due to external circumstances as will be more fully described hereinafter. The terminations 25 of the conductors from the sense side 13 that are disposed on the power side 12 are sometimes referred to hereinafter as sense islands 25. The sense islands 25 are joined to the major portions of the conductors 15 by conductive interconnections 27. It will be appreciated, however, that the purposes to which the conductors 14 and 15 are put may be reversed from that here described.

It will be noted on the sense side of the circuit board 10 there is a center conductor 28 that does not correspond to any conductor on the upper surface and does not extend through the circuit board to the upper surface. The center conductor 28 extends from the edge of the device receiving aperture 18 to the edge 26 of the circuit board 10. It is for the purpose of contacting the case of the electronic component 30 under test to determine that each of the leads 31 of the device are properly insulated from the case.

A notch 29 is provided in a corner of the circuit board 10 at the edge 26 and is for preventing the circuit board 10 from being improperly inserted within a printed circuit connector.

It will be apparent that the circuit board in accordance with this invention may be made by the techniques commonly referred to as printed circuitry such as by etching the conductive pattern 14 and 15 on the upper and lower surfaces from continuous conductive sheets disposed on insulating backing. The connections 27 of the conductors 15 on the sense side through the circuit board to the sense islands 25 on the power side of the board may be made by a variety of techniques of which chemical means such as plating or mechanical means such as rivets or pins are a few suitable examples.

As shown in FIG. 1, a back cover plate 35 is disposed over the bottom surface 13 of the circuit board 10 and conforms to the configuration of the circuit board 10 except that it does not extend beyond the notch 29 in the circuit board 10. The back cover plate 35 is a sheet of insulating material that may conveniently be similar to or like that of which the circuit board 10 itself is made and is bonded to the circuit board 10 to provide protective insulation for the conductors thereon. The back cover plate 35 also serves to help retain an electronic component under test within the device receiving aperture 18 of the circuit board 10 as the back cover plate 35 is not apertured. The back cover plate 35 has a conductor (not shown) extending in line with the center conductor 28 on the lower surface 13 of the circuit board 10 so as to make contact with the device package.

The electrical portion of the test fixture has now been described. It is, however, also significant to the performance of a test fixture that means are provided to retain the device under test in place. In accordance with the present invention the test fixture also comprises a barrier board 40, specifically illustrated in FIG. 5. The barrier board 40 is of an insulating material sheet, conveniently like that of the circuit board 10, and is fixed to the circuit board 10 by insulating plugs 42 (FIG. 2) that extend through apertures 43 of the barrier board 40 and apertures 22 and 23 of the circuit board 10.

The barrier board 40 has a device receiving aperture 45 with projections extending within the aperture from the sides thereof defining grooves 46 of a number and so spaced so as to receive in each a lead 31 of the electronic component to be tested. The barrier board 40 is disposed over the device receiving aperture 18 of the circuit board so that in placing an electronic component to be tested within the device receiving aperture 18 of the circuit board the leads thereof will automatically fall within the grooves 46 of the barrier board 40 providing positive lead location. If the leads of the device to be tested are not properly straight and parallel, the device may not be inserted into the test fixture.

An additional element of a test fixture in accordance with this invention is that particularly illustrated in FIG. 6 in inverted position relative to the other figures. This element is a pressure plate 50 comprising a sheet of insulating material 52, conveniently like that of the circuit board 10, on which there is mounted a projection of insulating material 54 having a depressed portion 55 and raised shoulder portions 56 that conform to the aperture of the barrier board so that the pressure plate 50 may be disposed over the device to be tested in a manner such that it applies pressure to the device leads to ensure good contact. The raised portions 53 on the pressure plate 50 are for locating it within the apertures 43 of barrier board 40. A layer of resilient material 58 such as soft rubber, may be disposed on the surface of the portions 56 to assist in the uniform application of pressure.

It will be recognized that the barrier board 40 and circuit board 10 (including the back cover plate 35) are for convenience usually permanently joined together. The pressure plate 50 is not, of course, as it must be removed in order to insert or remove a device 30 from the fixture.

The apertures 47 and 57 in the barrier board 40 and pressure plate 50, respectively, are merely for the purpose of orientation of a sheet of insulating material during a conventional multi-stage punching operation suitably used when these elements of the fixture are manufactured. Other indexing marks, such as notches at the periphery, may also be present.

FIG. 7 illustrates a means for retaining the pressure plate in proper position relative to the other components of the test fixture so that the device under test is fixed. In this example, the retaining means is the spring clip 60 that is disposed over the edge of the elements remote from that edge on which the conductors terminate. The spring clip bears on the top 52 of pressure plate 50 and on the back cover plate 35. It will be appreciated that other retaining means may be employed such as a hinge on the pressure plate 50 at one edge thereof and a spring catch at an opposing edge to lock it in place. However, a spring clip has been found preferable in order to minimize the expense of the test fixture and to minimize the total thickness required by the assembled elements of the test fixture.

In use, as shown in FIG. 2, an electronic component 30 in a flat package 32 having coplanar leads 31, a typical example of which is a semiconductor integrated circuit, is disposed within the test fixture by placement in the device receiving aperture 45 of the barrier board 40 (and, at the same time, within device receiving aperture 18 of circuit board 10) in a manner such that the leads 31 each fall within one of the grooves 46 in the barrier board 40. The leads 31 hence pass over the sense islands 25 and the terminations of power conductors 14 so that when the fixture is assembled by placement of the pressure plate 50 and spring clip 60 thereover the leads 31 are in good low resistance contact with both the sense islands 25 and the power conductors 14. It will be understood a device may be tested in the fixture that has fewer leads than could be accommodated by the grooves 46 and associated conductors.

The assembled test fixture is inserted into a printed circuit connector as previously described that has for example, a plurality of spring contacts, one for each of the conductors in the circuit board, that make contact with the conductors 14 and 15 and connect the electronic component 30 in a test circuit that may be of a conventional type for the particular device in question.

In the past, the performance of an integrated circuit in a test circuit was not a sure indication of the actual quality of the device as it was often the case that the thin, readily deformed leads, usually of a nickel-iron-cobalt alloy sold under the trademark Kovar, would be out of position and not properly in contact with the conductors on the circuit board. Other external conditions would also affect the performance of the device under test. In prior test fixtures no means were provided for distinguishing between poor performance due to a device of poor quality or poor performance due to lead deformation, unintended power variations in the test circuit or high resistance between the leads of the device and the conductors of the test circuit.

Such problems are avoided with the test fixture in accordance with the present invention but without adding appreciably to the complexity or expense of the test fixture itself or of the test procedure by which a component is tested. In the illustrated example, the conductors on the power side are for the provision of supply potentials and signals to the device under test to determine the quality of its performance for its intended function. For example, if the integrated circuit is an amplifier, then such qualities as gain and signal distortion will be determined from measurements made by instruments electrically related to the conductors on the power side. If the component under test is an integrated circuit for performing a logic function, then such qualities as switching speed and noise immunity would be the ones of interest and determined by measurement of parameters through the power conductors.

The conductors on the sense side, that extend through the circuit board and terminate on the power side, provide an indication of whether the test circuit and the device are properly interconnected. For example, if a lead of the device is badly deformed and no contact is made between that lead and the associated power conductor, the device is likely to appear as an inoperable device. However, in the present configuration, it is almost impossible for such a mistake to be made since the open circuit would be indicated in the sensing circuit. Similarly, line drop in the test circuit, poor contact pressure, high contact resistance or other deleterious external circumstances would be indicated in the sense circuit. Electrical circuits for the testing of devices and for sensing to ensure proper test are known and may be selected according to the particular electronic component under test.

While the provision of the sense leads and sense islands provides an advantageous function compared with previously available test fixtures by ensuring that any failure of good contact between the device and the test circuit is known, the test fixture in accordance with this invention additionally provides positive lead placement so that the likelihood that a device may be inserted in the test fixture with the leads not properly aligned is greatly minimized. This is a consequence of the use of the barrier board 40 disposed over the device receiving aperture 18 of the circuit board 10 and containing the grooves 46 that are aligned with the position of the leads 31 of the device to be tested and the sense islands 25 and terminations of the power conductors 14 on the circuit board. Consequently, the test operator upon inserting a component into the fixture will notice whether any lead are so deformed as to fail to make proper contact. The barrier board not only insures proper lead location initially, it provides a means of maintaining electrical isolation between the leads throughout testing.

Another important advantage of the barrier board configuration in accordance with this invention is that it permits the use of a circuit board with an entire family of different sized packages. A single circuit board design will serve with a variety of barrier board designs. For example, a barrier board having five grooves on each side, for a device having ten leads, may be readily used with the illustrated circuit board. The device receiving aperture 18 in the circuit board 10 need not conform exactly to any particular device configuration so long as it is large enough to receive any of the devices of the family to be tested on the particular circuit board. The function of the device receiving aperture is merely to locate the device generally and to permit the leads of the device that laterally extend therefrom to rest in the plane of the conductors on the power side of the circuit board. It was previously the case that test fixtures that provided positive lead location, as is provided by applicant's circuit board and barrier board configuration, would not be adaptable to an interchange of elements so as to permit the testing of a slightly different size package.

The pressure plate and spring clip provide positive pressure on the leads of the package and ensure low contact resistance and good contact pressure. The manner in which the pressure transferring projection 56 of the pressure plate is confined within the periphery of the aperture in the barrier board also is a factor that assists in ensuring good contact pressure while maintaining isolation between adjacent leads.

A device disposed within the test fixture is so well confined and protected that it may be readily shipped in this manner. This permits the user of the integrated circuit, or other electronic component, to test immediately the device received without requiring assembly of the device and test fixture combination. It also permits ease of handling and safe storage.

If desired, the test fixture may be fabricated with a window of transparent insulating material in the back cover plate 35 so that it can be determined whether a device is in the fixture merely by visual inspection.

Since the circuit board 10, the back cover plate 35, the barrier board 40 and the large area portion 52 of the pressure plate may be of the same insulating material, and hence have the same temperature coefficients, good temperature stability is provided.

The test fixture illustrated in the drawing is one that has been successfully made and used and found to have the advantages above-described. The figures of the drawing are not to any exact scale but are all between one and two times actual size. The insulating members of the fixture were of a commercially available phenolic resin impregnated fiber glass sheet. The conductive patterns were etched from copper sheets bonded to the opposing surfaces of the circuit board. The material may be selected in accordance with operating conditions such as temperature, humidity, etc. and cost.

While the present invention has been shown and described in a few forms only, it will be apparent that various changes and modifications may be made without departing from the spirit and scope thereof.

What is claimed is:

1. A text fixture for an electronic component in a package of the type having a flat enclosure with electrical leads extending from the shortest sides of the flat enclosure, said test fixture comprising: a circuit board of electrically insulating material having opposite major surfaces with first and second patterns of electrical conductors respectively on said major surfaces, each conductor extending from a point at an edge of one of said major surfaces to a termination at an internal point of said surface, the conductors on one of said surfaces extending through said circuit board to a position proximate the internal termination of the pattern of conductors on the other of said surfaces, said two patterns of conductors being distinct and not connected with each other; means for positioning a component to be tested including grooves for the reception of electrical leads, said means for positioning disposed on the surface of said circuit board that has the terminations of the conductors from the other side thereon so that each of said grooves lines up with an internal point of termination of a conductor of each pattern of conductors; means for confining a component to be tested within said means for positioning with the leads thereof in contact with both of said patterns of conductors.

2. A test fixture for an electronic component in a flat enclosure having coplanar electrical leads, such as a semiconductor integrated circuit, comprising: a circuit board having on a first surface thereof a first pattern of electrical conductors suitable for testing the quality of an electrical component under test and on the opposite surface thereof a second pattern of electrical conductors, distinct from and not connected with said first pattern, and being suitable for ensuring the component under test is properly disposed within the test circuit, said circuit board having a device receiving aperture therein, each of the conductors in said second set of conductors extending through said circuit board and having a termination on said first surface of said circuit board proximate to each one of the conductors in said first pattern and proximate to said device receiving aperture within said circuit board such that each lead of a component to be tested contacts a conductor of each of said first and second patterns when said component is positioned in said device receiving aperture; means for providing positive lead location of the component under test disposed adjacent said device receiving aperture with leads in contact with the termination of both sets of conductors; means for applying pressure substantially only to the leads of the component under test on two sides of the enclosure where said leads contact said two sets of conductors to ensure good contact pressure and low contact resistance while retaining said enclosure securely and means for retaining the elements of said test fixture in fixed location so as to permit ease in handling and storage.

3. A test fixture in accordance with claim 1 wherein said means for positioning comprises a barrier board of electrically insulating material having an aperture to receive the component to be tested and said means for confining a component to be tested comprises a pressure plate having a pair of projections for extending within said aperture in said barrier board and for applying pressure directly to the leads extending from two opposite sides of the enclosure of the component to be tested where said leads contact said two sets of conductors and a solid cover between said projections for extending over said enclosure.

4. A test fixture in accordance with claim 2 wherein said means for providing positive lead location comprises a barrier board of a sheet of insulating material having an aperture and a configuration of grooves extending therefrom for the location of each of the leads of the component to be tested, said barrier board disposed over and bonded to said circuit board in a manner so that each of said grooves is in alignment with the termination of one of each of said sets of conductors.

5. A test fixture in accordance with claim 2 wherein: said means for providing positive lead location comprises a member joined with said circuit board and having a plurality of projections defining a groove for each of the leads of the component to be tested.

6. A test fixture in accordance with claim 2 further comprising an additional conductor solely on the surface of said circuit board having said second pattern of electrical conductors thereon and extending to said device receiving aperture; a back cover plate of insulating material joined to said circuit board and disposed over said device receiving aperture, said second pattern of conductors and said additional conductor, a conductor disposed on the surface of said back cover plate over said aperture and contacting said additional conductor on said circuit board to provide means of electrical contact to the enclosure of the component to be tested.

7. A test fixture in accordance with claim 2 wherein: each of the conductors in each of said sets of conductors has a second termination at one edge of said circuit board for permitting insertion of said test fixture in a printed circuit connector, said circuit board has an asymmetrical configuration about a center axis in the plane thereof to facilitate handling and testing; and said circuit board has apertures therein to permit stacking a plurality of fixtures for machine handling and testing.

References Cited by the Examiner

UNITED STATES PATENTS

| | | | |
|---|---|---|---|
| 2,063,110 | 12/1936 | McArdle | 339—191 X |
| 2,524,939 | 10/1950 | Stephan | 339—17 |
| 2,824,291 | 2/1958 | McLean et al. | 324—158 |
| 2,858,515 | 10/1958 | Thunander | 339—17 |
| 2,956,257 | 10/1960 | Reed | 339—17 |
| 2,974,275 | 3/1961 | Haviland. | |
| 3,011,379 | 12/1961 | Corwin. | |
| 3,184,699 | 5/1965 | Spera | 339—17 |
| 3,191,100 | 6/1965 | Sorvillo | 317—101 |
| 3,192,307 | 6/1965 | Lazar | 339—17 X |

OTHER REFERENCES

Advances in Electronic Circuit Packaging, vol. 2, copyright 1962, Plenum Press, pp. 101, 102.

Electromechanical Design, September 1961, pp. 24, 26.

WALTER L. CARLSON, *Primary Examiner.*

RUDOLPH V. ROLINEC, *Examiner.*

E. L. STOLARUN, *Assistant Examiner.*